(12) United States Patent
Uboweja

(10) Patent No.: US 12,462,704 B1
(45) Date of Patent: Nov. 4, 2025

(54) GENERATING TRAINING MODULES FOR VIRTUAL REALITY ENVIRONMENTS

(71) Applicant: Truist Bank, Charlotte, NC (US)

(72) Inventor: Saloni Uboweja, Cary, NC (US)

(73) Assignee: TRUIST BANK, Charlotte, NC (US)

( * ) Notice: Subject to any disclaimer, the term of this patent is extended or adjusted under 35 U.S.C. 154(b) by 0 days.

(21) Appl. No.: 18/651,782

(22) Filed: May 1, 2024

(51) Int. Cl.
  *G09B 5/06* (2006.01)
  *G06T 17/00* (2006.01)
  *G06T 19/00* (2011.01)

(52) U.S. Cl.
  CPC ............. *G09B 5/065* (2013.01); *G06T 17/00* (2013.01); *G06T 19/00* (2013.01); *G06T 2219/024* (2013.01)

(58) Field of Classification Search
  CPC .......... G09B 5/06; G09B 5/065; G06T 17/00; G06T 19/00; G06T 2219/00; G06T 2219/024
  See application file for complete search history.

(56) References Cited

U.S. PATENT DOCUMENTS

| 2019/0251853 A1* | 8/2019 | Schindermann | G09B 7/00 |
| 2020/0111377 A1* | 4/2020 | Truong | G10L 15/26 |
| 2024/0338891 A1* | 10/2024 | Donnell | G06F 3/14 |

\* cited by examiner

*Primary Examiner* — Timothy A Musselman
(74) *Attorney, Agent, or Firm* — Michael A. Springs, Esq.; Shumaker, Loop & Kendrick, LLP; Patrick B. Horne

(57) ABSTRACT

Disclosed are systems and methods for generating training modules for simulating a shared experience in a graphically simulated virtual reality environment by a computer with executable code. The system collects audio data, video data, and event data, and the audio data is converted to machine encoded communication elements that are used to determine an interaction driver. Training video interface data is generated based on the video data, the interaction driver, and the event data. The training video data is in turn used to create a training module consisting of the training video interface data, event data, and interrogatory data that simulates a virtual interaction between a simulation end user and an agent. The user interacts with the training module and model responses and a performance score is generated for supervisor review.

20 Claims, 9 Drawing Sheets

GENERATING TRAINING MODULES FOR VIRTUAL REALITY ENVIRONMENTS

TECHNICAL FIELD

This invention relates generally to systems and methods for generating training modules for simulating a shared experience in a graphically simulated virtual reality environment.

BACKGROUND

Training system users on system operations is required to maintain efficient enterprise system and resource usage. Additionally, enterprises are increasingly accommodating remote and/or geographically dispersed groups of system users. Traditional approaches to training are resource intensive and require that personnel provide synchronous training to both new and existing system users. These challenges can be amplified when new functionalities or bug fixes are added to an enterprise platform, which requires a constant need for system user training.

Virtual reality (VR) technology has become a household term and is now present in many homes as an entertainment form for adults, children, and teens. The immersive experience available through VR is increasingly being used, not just as an in-home entertainment means, but also as a way to replicate work environments.

What is needed is a system and method of use that may effectively and efficiently train large quantities of geographically separated system users and agents during onboarding, as well as when new functionalities are launched or when repairs are made to an enterprise platform. Such training should replicate real-world system environments, tracking progress, reduce training costs, and reduce the need for facilitators and support personnel.

The invention describes innovative learning methods, grounded in the application of virtual reality ("VR"), artificial intelligence ("AI") and/or machine learning, to use current platform demonstration videos, procedure documents, and prior end user call data to generate practice virtual reality training modules to train to large volumes of system users, while lowering the cost of training delivery. Furthermore the training system provides system users the ability to simulate platform features in a virtual reality environment, foregoing the need to create an end to end training environment with access set-up needs for each user.

The benefits of the invention may include lower cost through, e.g., expediting the on-boarding process, lowering the cost to facilitate training, and reducing the number of facilitators and support personnel. Additionally, the invention eliminates the need to train facilitators. The disclosed systems and methods automate actions formerly associated with facilitators, e.g., providing instruction and providing evaluations, at scale. Additionally, the disclosed systems and methods provide, through automated artificial intelligence technology, personalized, facilitation of real-time feedback and progress tracking. As a result, the faster feedback is achieved to lessen the onboarding period, leading to time savings. Furthermore, the disclosed systems and methods may improve quality of training by improving the operational speed to proficiency.

SUMMARY

According to one embodiment, a system for generating a training module having a computer that includes a processor, a communication interface, and a memory device that stores executable code to implement the present systems and methods. A digital recorder captures event data and interactive communications (e.g., call transcripts) and stores the interactive communications to the memory device as interactive content files. The interactive content files consist of audio data and video data that are configured for display on an agent computing device. The audio data is converted to alphanumeric text data. The alpha numeric text generates an interaction driver (e.g., why a user initiated the interaction with the agent) and at least one interrogatory (e.g., "I am locked out of my account"). The interaction driver is associated with the interrogatory and stored to a relational database integrated with the memory device. The video data, the event data, and the interaction driver generate training video interface data. The training video interface data comprises agent computing device user interface display data.

The interaction driver, the interrogatory, and the training video interface data are packaged into a training module that comprises executable training module code. When executed, the training module code implements a training interaction. The training interaction displays the training video interface data and the interrogatory to the agent computing device and simulates a virtual interaction between a simulated end user and an agent computing device user. The agent inputs responses to the first training interaction and the responses are measured to provide a performance score. The performance measurement is provided to the supervisor computing device. Example input responses may be provided after the agent's responses. A selection module is comprised of a neural network that generates the training video interface data. The selection module allows you to pick the topic of instruction. The neural network may consist of a clustering network architecture. In another embodiment upon completion of the training module, a digital certificate is generated and sent to the agent computing device.

The above described system can be used with a virtual reality display device connected to the agent computing device. The virtual reality display device renders the video interface data in a three dimensional virtual reality environment. The three dimensional virtual reality environment is generated using a three-dimensional model based at least in part on photogrammetry.

Optionally, the processor can produce a sentiment analysis and incorporate it into the training module.

BRIEF DESCRIPTION OF THE DRAWINGS

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

DETAILED DESCRIPTION

Figure 1:
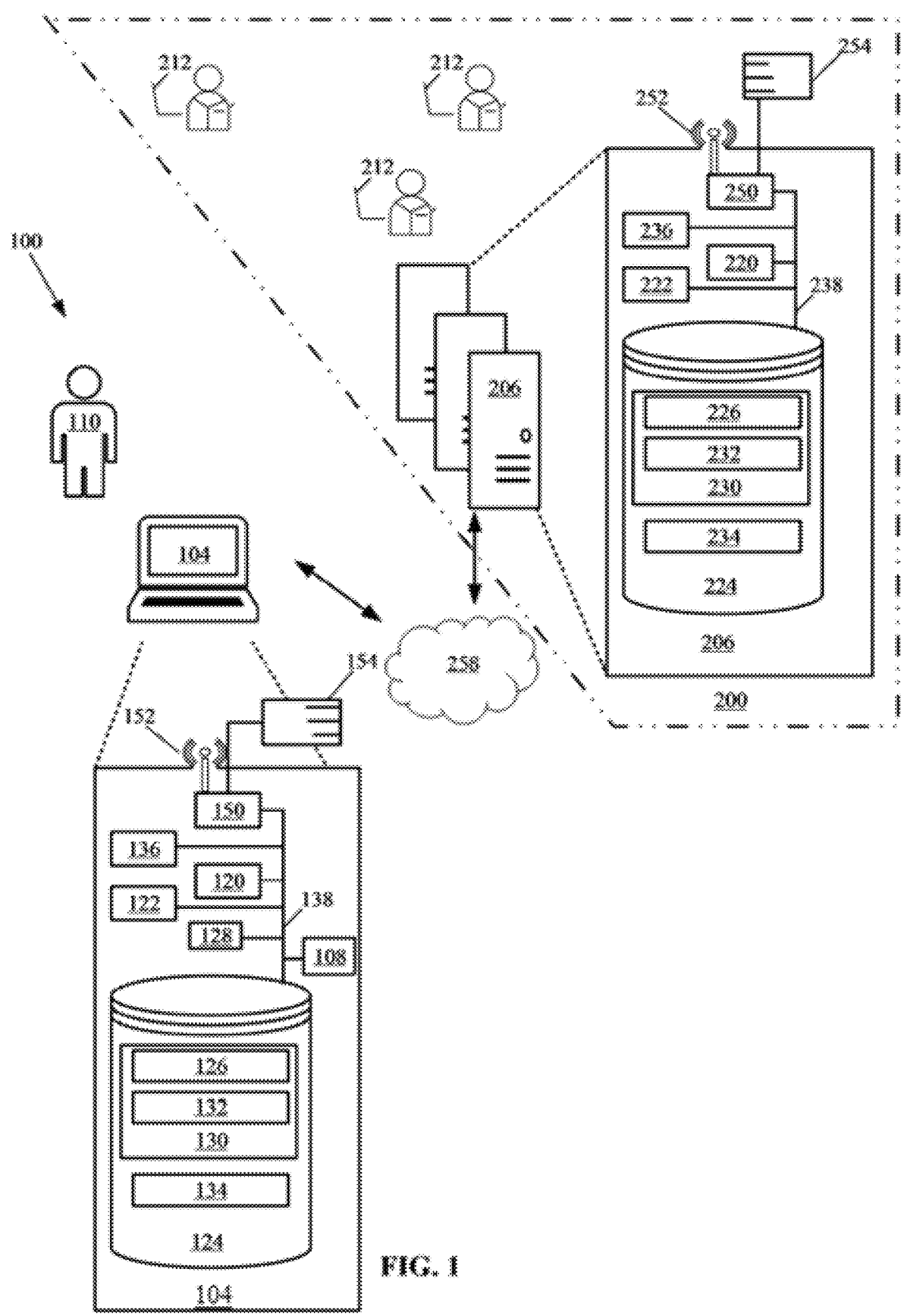
FIG. 1 illustrates an enterprise system, and environment thereof for creating a virtual reality training module for users using artificial intelligence, in accordance with an embodiment of the present invention.

Aspects of the present invention and certain features, advantages, and details thereof are explained more fully below with reference to the non-limiting examples illustrated in the accompanying drawings. Descriptions of well-known processing techniques, systems, components, etc. are omitted so as to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

Unless described or implied as exclusive alternatives, features throughout the drawings and descriptions should be taken as cumulative, such that features expressly associated with some particular embodiments can be combined with other embodiments.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures.

One or more aspects of an illustrative embodiment can be implemented in hardware, software, or a combination thereof.

As understood by one skilled in the art, program code, as referred to in this application, can include both software and hardware. For example, program code in certain embodiments of the present invention can include fixed function hardware, while other embodiments can utilize a software-based implementation of the functionality described. Certain embodiments combine both types of program code.

System Configuration

FIG. 1 illustrates a system 100 and environment thereof, according to at least one embodiment, by which a user 110 benefits through use of services and products of an enterprise system 200. The environment may include, for example, a distributed cloud computing environment (private cloud, public cloud, community cloud, and/or hybrid cloud), an on-premise environment, fog computing environment, and/or an edge computing environment. The user 110 accesses services and products by use of a computing device 104, which can be, as non-limiting examples, a desktop computer, a laptop computer, or other user-accessible computing device.

Furthermore, the computing device 104 may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the computing device 104, which may be personal or public items. Although the user 110 may be singly represented in some drawings, at least in some embodiments according to these descriptions the user 110 is one of many such that a market or community of users, consumers, patrons, business entities, government entities, clubs, and groups of any size are all within the scope of these descriptions.

The computing device 104, includes components such as, at least one of each of a processing device 120, and a memory device 122 for processing use, such as random access memory (RAM), and read-only memory (ROM). The illustrated computing device 104 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user 110 or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the computing device 104 described herein. For example, the memory device 122 may include such applications as a conventional web browser application. These applications also typically provide a graphical user interface ("GUI") on the display that allows the user 110 to communicate with the computing device 104, and, other devices or systems. In one embodiment, when the user 110 needs end user service training, the user 110 downloads or otherwise obtains the training application from the enterprise system 200, or from a distinct application server.

The processing device 120, and other processors described herein, generally include circuitry for implementing communication and/or logic functions of the computing device 104. For example, the processing device 120 may include a digital signal processor, a microprocessor, and various analog to digital converters, digital to analog converters, and/or other support circuits. Control and signal processing functions of the computing device 104 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the computing device 104 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the computing device and the applications and devices that facilitate functions of the computing device, or are in communication with the computing device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The computing device 104, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display (e.g., a liquid crystal display (LCD), light emitting diode (LED) display, or the like), which can be, as a non-limiting example, a presence-sensitive input screen (e.g., touch screen or the like) of the computing device 104, which serves both as an output device, by providing graphical and text indicia and presentations for viewing by one or more user 110, and as an input device, by providing virtual buttons, selectable options, a virtual keyboard, and other indicia that, when touched, control the computing device 104 by user action. The user output devices include a speaker or other audio device. The user input devices, which allow the computing device 104 to receive data and actions such as button manipulations and touches from a user such as the user 110, may include any of a number of devices allowing the computing device 104 to receive data from a user, such as a keypad, keyboard, touch-screen, touchpad, microphone, mouse, joystick, other pointer device, button, soft key, infrared sensor, and/or other input device(s). The input and output system 136 may also include a camera, such as a digital camera.

Further non-limiting examples of input devices and/or output devices include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the computing device 104. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user 110 such as, for example fingerprint recognition systems and the like (hand print recognition systems, palm print recognition systems, etc.), iris recognition and the like used to authenticate a user 110 based on features of the user's eyes, facial recognition systems based on facial features of the user, DNA-based authentication, or any other suitable biometric attribute or information associated with a user. Additionally or alternatively, voice biometric systems may be used to authenticate a user 110 using speech recognition associated with a word, phrase, tone, or other voice-related features of the user 110. Alternate authentication systems may include one or more systems to identify a user 110 based on a visual or temporal pattern of inputs provided by the user. For instance, the computing device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The computing device may enable users to input any number or combination of authentication systems.

The computing device 104 may also include a positioning device 108, which can be for example a global positioning system device (GPS) configured to be used by a positioning system to determine a location of the computing device 104. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the computing device 104. In other embodiments, the positioning device 108 includes a proximity sensor or transmitter, such as an RFID tag, that can sense or be sensed by devices known to be located proximate a location to determine that the computing device 104 is located proximate these known devices.

In the illustrated example, a system intraconnect 138, connects, for example electrically, the various described, illustrated, and implied components of the computing device 104. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the computing device 104. As discussed herein, the system intraconnect 138 may operatively couple various components with one another, or in other words, electrically connects those components, either directly or indirectly—by way of intermediate component(s)—with one another.

The computing device includes a communication interface 150, by which the computing device 104 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the computing device 104 may be configured to operate with one or more air interface standards, communication protocols, modulation types, and access types. By way of illustration, the computing device 104 may be configured to operate in accordance with non-cellular communication mechanisms, such as via a wireless local area network (WLAN) or other communication/data networks.

The computing device 104 further includes a power source 128, such as a battery, for powering various circuits and other devices that are used to operate the computing device 104. Embodiments of the computing device 104 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

The system 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include virtual reality training modules that emulates or replicates interactions between a user 110 and a simulated end user; virtual reality training modules that emulate a real engagement with an end user based on a variety of media such as voice recordings, chat transcripts, etc.; collecting data and creating evaluation scores for assessment of an end user service agent's progress throughout a training module.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user 110 or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the computing device.

The computing system 206, in the illustrated example, includes a communication interface 250, by which the computing system 206 communicates with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the conductive connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 104, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The computing device 104 and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user computing device 104. Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

In certain embodiments, one or more of the systems such as the user computing device 104, and/or the enterprise system 200, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

Artificial Intelligence Technology

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to use various analytical tools (e.g., algorithmic applications) to leverage data to make predictions or decisions. Machine learning programs may be configured to implement various algorithmic processes and learning approaches including, for example, decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

Machine learning models are trained using various data inputs and techniques. Example training methods may include, for example, supervised learning, (e.g., decision tree learning, support vector machines, similarity and metric learning, etc.), unsupervised learning, (e.g., association rule learning, clustering, etc.), reinforcement learning, semi-supervised learning, self-supervised learning, multi-instance learning, inductive learning, deductive inference, transductive learning, sparse dictionary learning and the like. Example clustering algorithms used in unsupervised learning may include, for example, k-means clustering, density based special clustering of applications with noise (DBSCAN), mean shift clustering, expectation maximization (EM) clustering using Gaussian mixture models (GMM), agglomerative hierarchical clustering, or the like. According to one embodiment, clustering of data may be performed using a cluster model to group data points based on certain similarities using unlabeled data. Example cluster models may include, for example, connectivity models, centroid models, distribution models, density models, group models, graph based models, neural models and the like.

One subfield of machine learning includes neural networks, which take inspiration from biological neural networks. In machine learning, a neural network includes interconnected units that process information by responding to external inputs to find connections and derive meaning from undefined data. A neural network can, in a sense, learn to perform tasks by interpreting numerical patterns that take the shape of vectors and by categorizing data based on similarities, without being programmed with any task-specific rules. A neural network generally includes connected units, neurons, or nodes (e.g., connected by synapses) and may allow for the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short term memory networks, as well as various other neural networks.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An artificial neural network (ANN), also known as a feedforward network, may be utilized, e.g., an acyclic graph with nodes arranged in layers. A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

Figure 2A:
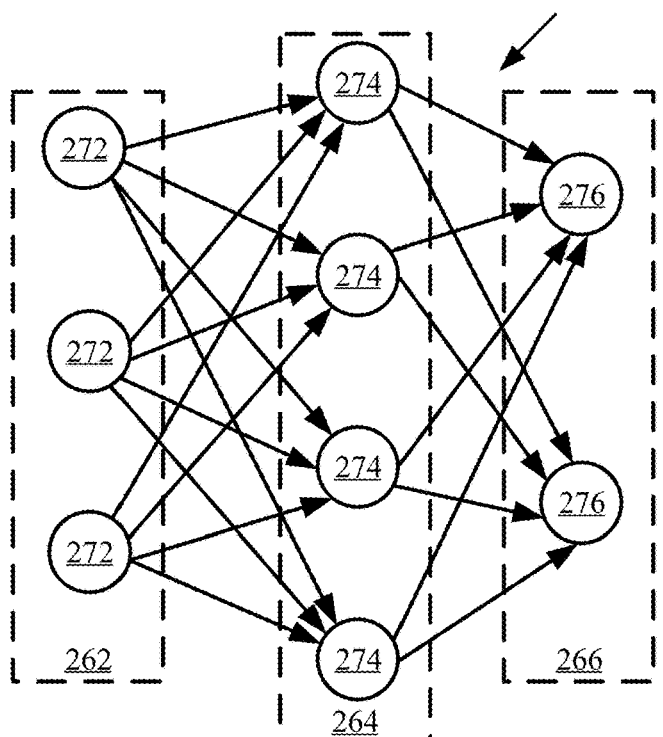
FIG. 2A is a diagram of a feedforward network, according to at least one embodiment, utilized in machine learning.
Figure 2C:
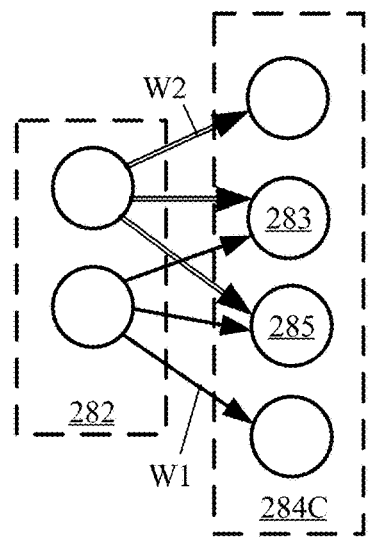
FIG. 2C is a diagram of a portion of the convolution neural network of FIG. 2B, according to at least one embodiment, illustrating assigned weights at connections or neurons.
Figure 2B:
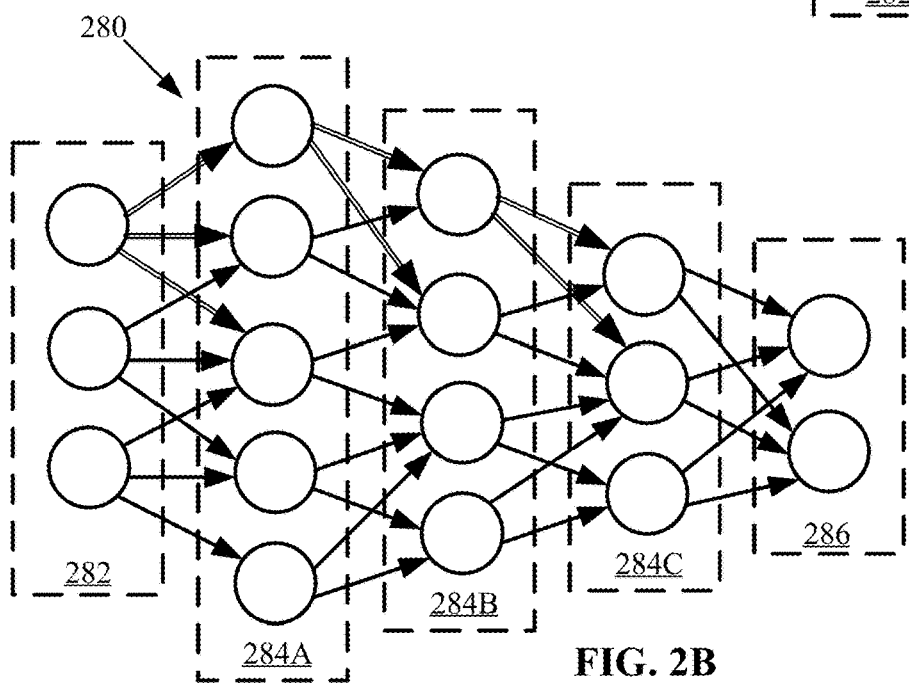
FIG. 2B is a diagram of a convolution neural network, according to at least one embodiment, utilized in machine learning.

An exemplary CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
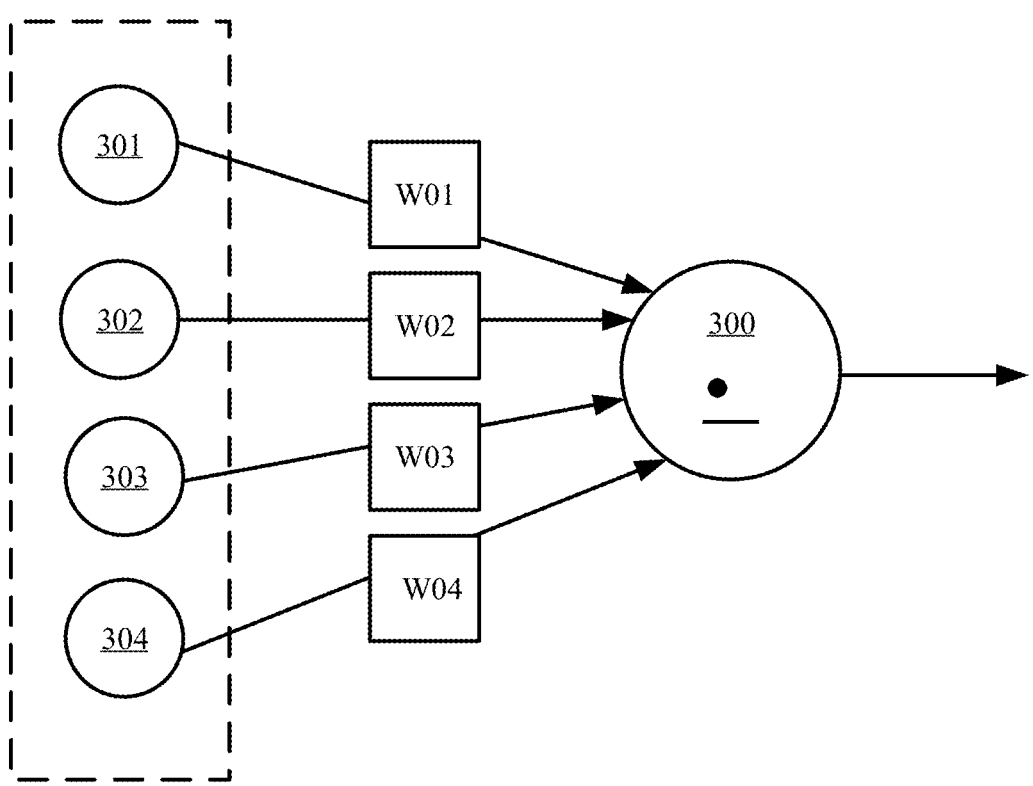
FIG. 3 is a diagram representing an exemplary weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

Figure 4:
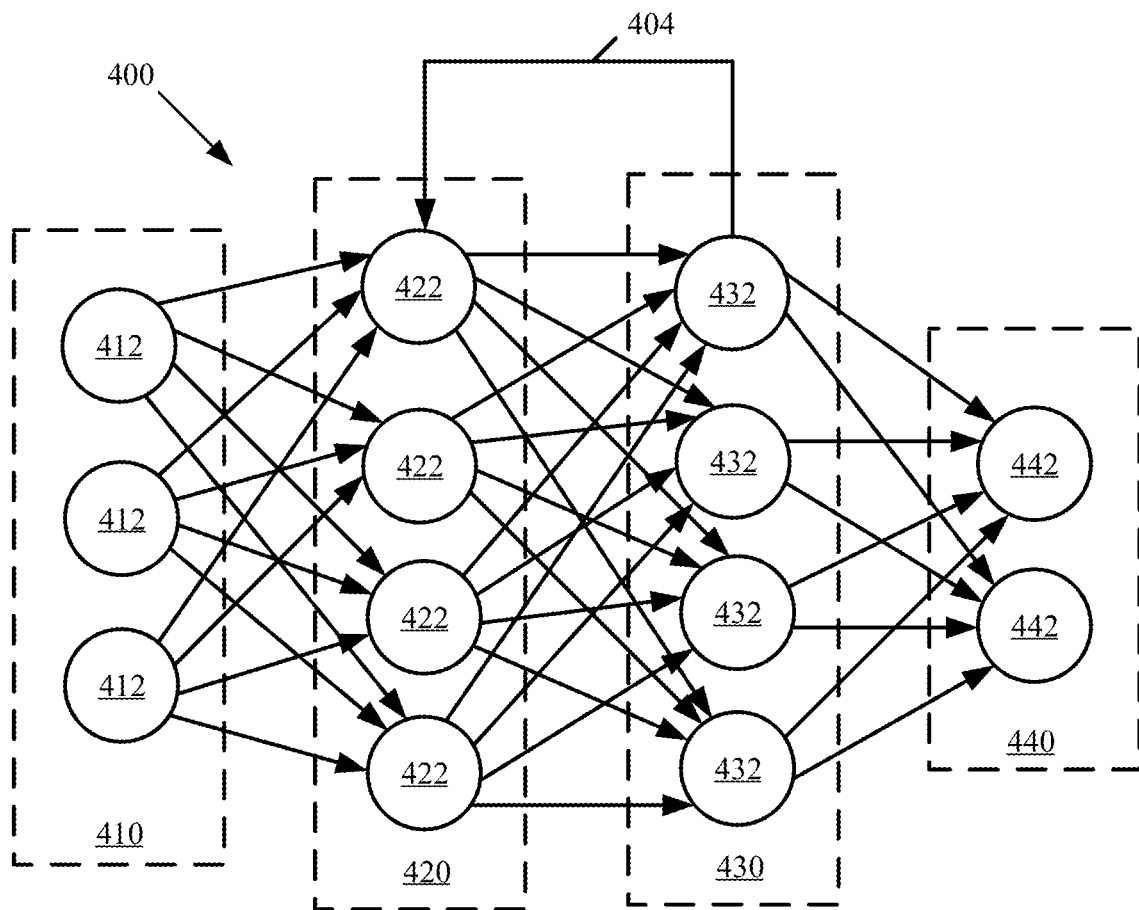
FIG. 4 is a diagram of a Recurrent Neural Network RNN, according to at least one embodiment, utilized in machine learning.

An example for a RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine-learning program may include one or more support vector machines. A support vector machine may be configured to determine a category to which input data belongs. For example, the machine-learning program may be configured to define a margin using a combination of two or more of the input variables and/or data points as support vectors to maximize the determined margin. Such a margin may generally correspond to a distance between the closest vectors that are classified differently. The machine-learning program may be configured to utilize a plurality of support vector machines to perform a single classification. For example, the machine-learning program may determine the category to which input data belongs using a first support vector determined from first and second data points/variables, and the machine-learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine-learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine-learning program may include a relatively large number of layers, e.g., three or more layers, and may be referred to as deep neural networks. For example, the node of each hidden layer of a neural network may be associated with an activation function utilized by the machine-learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input/output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Figure 5:
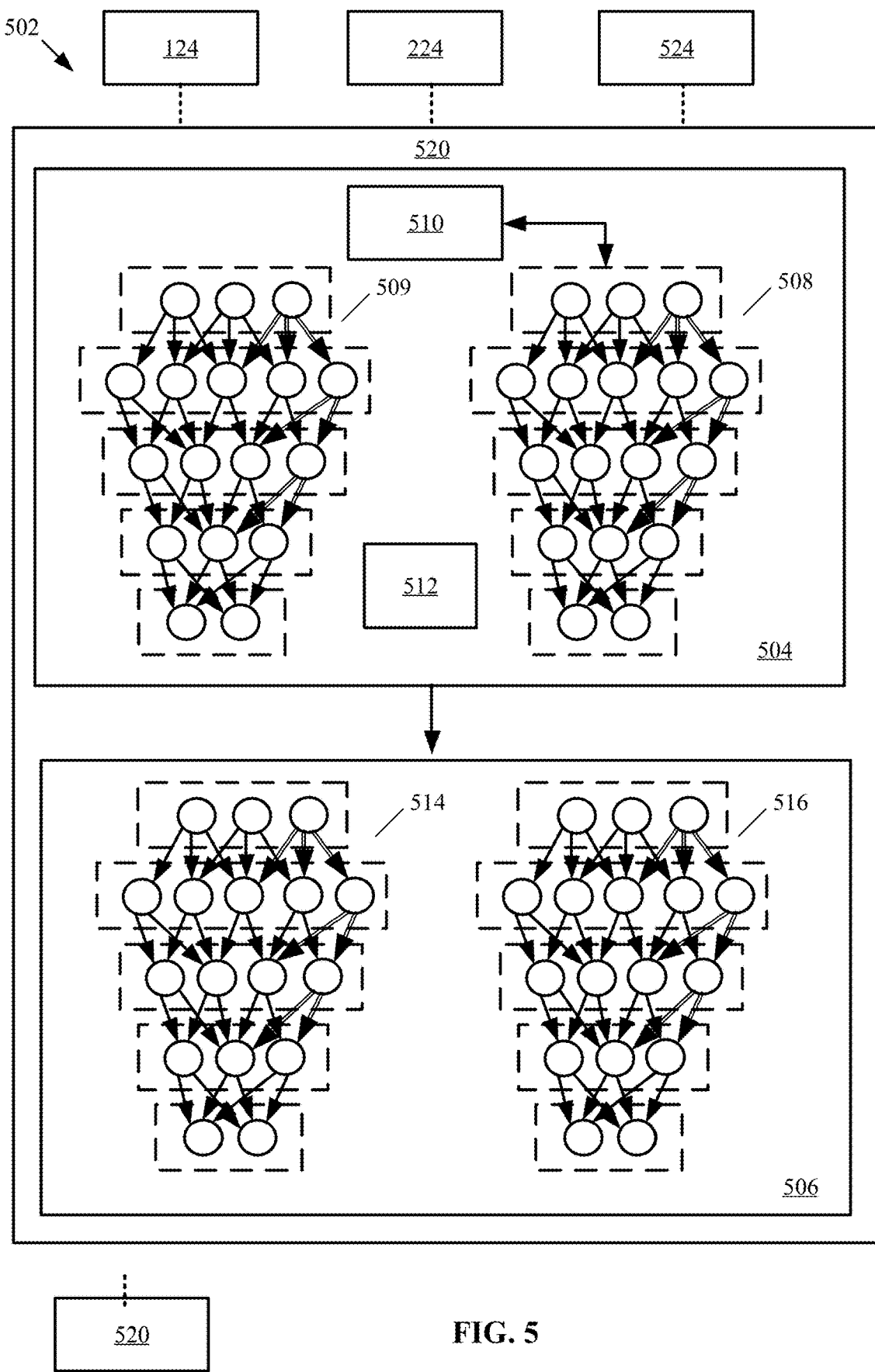
FIG. 5 is a schematic logic diagram of an artificial intelligence program including a front-end and a back-end algorithm.

Referring now to FIG. 5 and some embodiments, an AI program 502 may include a front-end algorithm 504 and a back-end algorithm 506. The AI program 502 may be implemented on an AI processor 520, such as the processing device 220, and/or a dedicated processing device. The instructions associated with the front-end algorithm 504 and the back-end algorithm 506 may be stored in an associated memory device and/or storage device of the system (e.g., storage device 224 and/or memory device 222) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation such as natural language processing). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine-learning framework (e.g., hardware). The machine-learning framework may include an index of basic operations, subroutines, and the like (primitives) typically implemented by AI and/or machine learning algorithms. Thus, the AI program 502 may be configured to utilize the primitives of the framework to perform some or all of the calculations required by the AI program 502. Primitives suitable for inclusion in the machine-learning framework include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine-learning program may include variations, adaptations, and alternatives suitable to perform the operations necessary for the system, and the present disclosure is equally applicable to such suitably configured machine learning and/or artificial intelligence programs, modules, etc. For instance, the machine-learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine-learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

Figure 6:
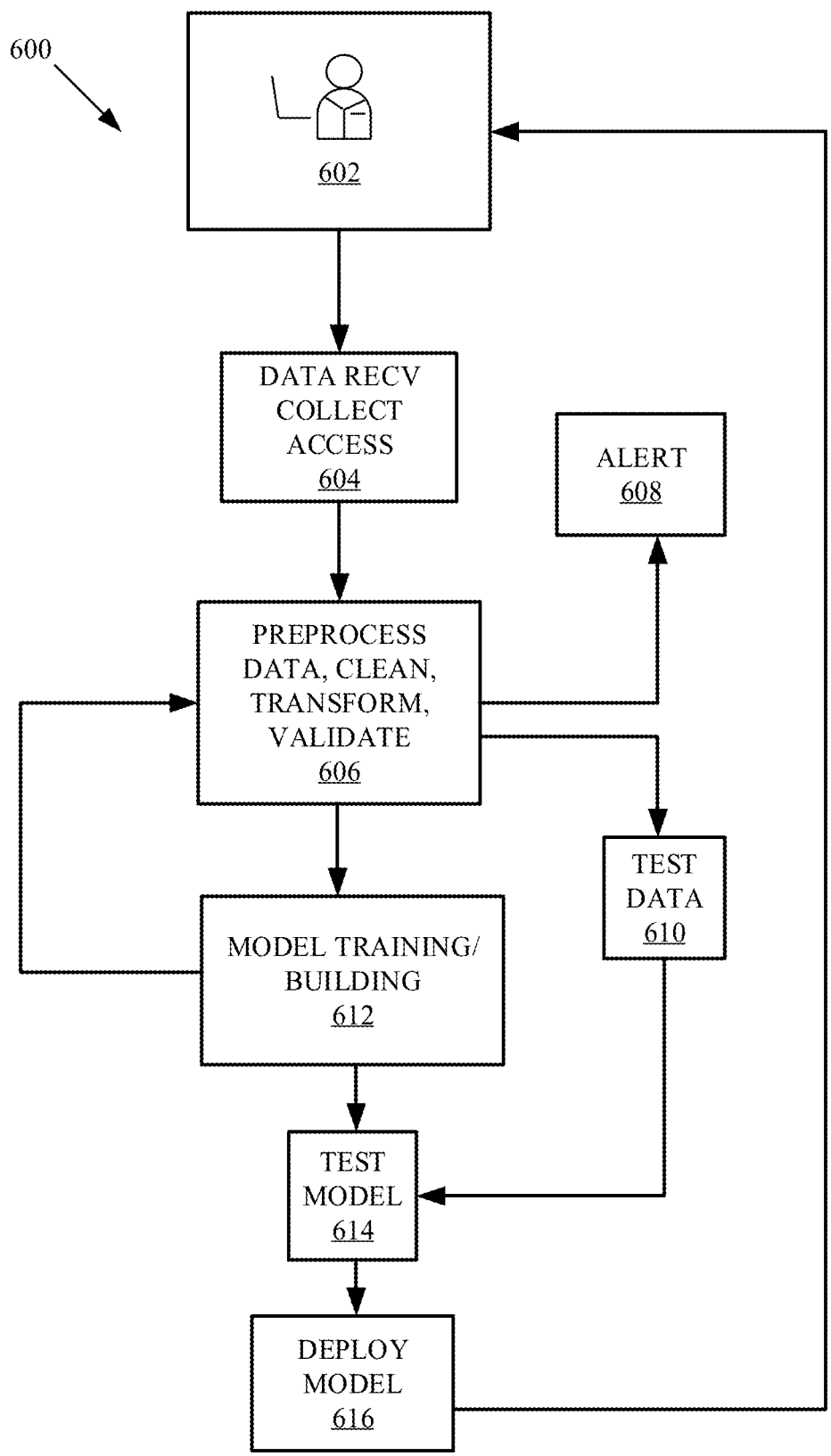
FIG. 6 is a flow chart representing a method, according to at least one embodiment, of model development and deployment by machine learning.

FIG. 6 is a flow chart representing a method 600, according to at least one embodiment, of model development and deployment by machine learning. The method 600 represents at least one example of a machine learning workflow in which steps are implemented in a machine-learning project.

In step 602, a user authorizes, requests, manages, or initiates the machine-learning workflow. This may represent a user such as human agent requesting AI functionality to simulate intelligent behavior, such a simulated learning module by emulating or replicating interactions between a user and a simulated end user. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606, the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior and generate simulation training modules serve as non-limiting examples.

Capturing Interactive Content Data

The provider system can be configured to generate interactive content data manually or to obtain interactive content data from a third party source, such as a cloud storage service or remote database. To generate interactive content data manually, a provider utilizes a computing device to accesses a remote third party system to download audio data or alphanumeric text data representing written communications between an end user and an agent or a transcription of an oral discussion.

An agent accesses the third party system using a software application compatible with the third party system that can be integrated with the agent computing device, such as an integrated mobile software application or an application programmable interface ("API") software application that facilitates communication between software and systems by mapping computer-readable commands and data formats between systems. In another embodiment, the agent computing device accesses the third party system using an Internet browser software application to access a web-based software interface.

Agent-end user interactions generally commence when an end user initiates contact with an agent by telephone or written electronic communication (e.g., email, SMS text message, an instant chat message, or a social media message). The interactive content data can take the form of written electronic communications, or interactive content data can be generated by recording and transcribing telephonic communications between an end user and a provider system or agent. Captured audio data is stored to the provider system and transcribed into alphanumeric text data using a speech-to-text software application and stored as interactive content data files comprising interactive content data. In some embodiments, the speech-to-text conversion is performed by a third party, and the provider system downloads and stores the interactive content data directly from the remote third party source.

The interactive content data can be stored directly to a provider system or stored to a third party database, such as a cloud service storage or software as a service provider. The interactive content data is stored to a relational database that maintains the interactive content data in a manner that permits the interactive content data files to be associated with certain information, such as one or more subject identifications and content metadata. Storing to a relational database further facilitates expedient sorting of the data, such as retrieving interactive content data having time and date data (called "sequencing data") within a predefined range of dates.

The interactive content data can be associated with one or more categories of content metadata and stored as content data files to an Interaction Database on the provider system. Content metadata can include, for example: (i) sequencing data representing the date and time when the interactive content data was created or otherwise representing an order or sequence in which a shared experience reflected in the interactive content data occurred relative to other shared experiences; (ii) subject identification data that characterizes the subjects or topics addressed within the interactive content data (e.g., "technical support" or "new product launch demonstration"); (iii) interaction driver identification data, which can be a subset or subcategory of subject identification data, and that identifies the reasons why a shared experience was initiated (i.e., the reason an end user initiated the interaction can be, and typically is, a subject or topic addressed within the interactive content data); (iv) weighting data representing the relative importance of subject identifications through, for example, an analysis of the frequency of communication elements contributing to the subject identification; (v) content source identification data that identifies one or more participants to the interaction, which can include a name, an affiliated employer or business, or a job title or role and can further comprise agent identification data or user identification data that identifies an agent or end user by name or identification number; (vi) provider identification data that identifies owner of the interactive content data; (vii) user source data, such as a telephone number, email address, or user device IP Address; (viii) sentiment data, including sentiment identifications; (ix) polarity data indicating the relative positive or negative degree of sentiment occurring during a shared experience; (x) resolution data indicating whether a particular user issue was resolved or not, and if so, how the issue was resolved (e.g., the issue is a user forgot a password, and the resolution was a password reset); (xi) an agent identification indicating the agent that participated in the shared experience; or (xii) other types of data useful for provider service to a user or processing interactive content data.

Agent-end user interactions generally commence when an end user contacts an agent through an incoming interaction request. The incoming interaction request includes incoming interaction initialization data, which can be multi-frequency signal tones or data packets representing a user device IP address, email address, or digital routing information. The provider system includes a source identification software service that processes the incoming interaction initialization data to generate user source data, such as a telephone number, a user device Internet Protocol ("IP") Address, an email address, or a social media or other account name.

The source identification software service determines the telephone number of the incoming call source as incoming telephone number data using techniques that can include, for example, automatic number identification ("ANI"). In that case, the incoming interaction initialization data can be ANI data, which is generally transmitted along with an incoming telephone call using multi-frequency signaling, which can be a digital tone that is translated to a numeric value. For Voice-over-Internet Protocol ("VoIP") calling, the incoming telephone number can instead be received as packets of digital information within the incoming interaction initialization data. The source identification software service processes the incoming interaction initialization data (i.e., the ANI data or IP data packets) to determine the source data as incoming telephone number data. The provider system uses the incoming telephone number data to query an internal end user database to determine whether the incoming telephone number corresponds to an existing user.

When an end user initiates an agent-end user interaction by communicating with an agent through written electronic communications or VoIP, the communications originate from a user computing device 104, such as a personal computer, a smart phone, or tablet computing device. In that instance, the source identification software service processes the incoming initialization data to capture or determine user source data that can include a user device IP address for the user computing device 104, an email address, or a social media or other account name.

The provider system utilizes the user source data to transmit a query to the provider's internal end user database to determine if an existing database record matches user source data. In this manner, either the incoming telephone number, the user device IP address, email address, or other user source data is used to determine to identity of the end user and whether the user is a current or former user.

Natural Language Processing

Neural Network Architectures and Natural Language Processing

The system processes the interactive content data using natural language processing technology that is implemented by one or more artificial intelligence software applications and systems. The artificial intelligence software and systems are in turn implemented using neural networks. Natural language processing technology analyzes one or more content data files that include alphanumeric textual data composed of individual communication elements, such as words, symbols or numbers. Natural language processing software techniques are implemented as unsupervised learning techniques that identify and characterize hidden structures of unlabeled interactive content data, or supervised techniques that operate on labeled interactive content data and include instructions informing the system which outputs are related to specific input values.

Supervised software processing can rely on iterative training techniques and training data to configure neural networks with an understanding of individual words, phrases, subjects, sentiments, and parts of speech. As an example, training data is utilized to train a neural network to recognize that phrases like "locked out," "change password," or "forgot login" all relate to the same general subject matter when the words are observed in proximity to one another at a significant frequency of occurrence.

Supervised learning software systems are trained using content data that is well-labeled or "tagged." During training, the supervised software systems learn the best mapping function between a known data input and expected known output (i.e., labeled or tagged content data). Supervised natural language processing software then uses the best approximating mapping learned during training to analyze unforeseen input data (never seen before) to accurately predict the corresponding output. Supervised learning software systems often require extensive and iterative optimization cycles to adjust the input-output mapping until they converge to an expected and well-accepted level of performance, such as an acceptable threshold error rate between a calculated probability and a desired threshold probability.

The software systems are supervised because the way of learning from training data mimics the same process of a teacher supervising the end-to-end learning process. Supervised learning software systems are typically capable of achieving excellent levels of performance but only when enough labeled data is available. Developing, scaling, deploying, and maintaining accurate supervised learning software systems can take significant time, resources, and technical expertise from a team of skilled data scientists. Moreover, precision of the systems is dependent on the availability of labeled content data for training that is comparable to the corpus of content data that the system will process in a production environment.

Supervised learning software systems implement techniques that include, without limitation, Latent Semantic Analysis ("LSA"), Probabilistic Latent Semantic Analysis ("PLSA"), Latent Dirichlet Allocation ("LDA"), and more recent Bidirectional Encoder Representations from Transformers ("BERT"). Latent Semantic Analysis software processing techniques process a corporate of content data files to ascertain statistical co-occurrences of words that appear together which then give insights into the subjects of those words and documents.

Unsupervised learning software systems can perform training operations on unlabeled data and less requirement for time and expertise from trained data scientists. Unsupervised learning software systems can be designed with integrated intelligence and automation to automatically discover information, structure, and patterns from content data. Unsupervised learning software systems can be implemented with clustering software techniques that include, without limitation, K-mean clustering, Mean-Shift clustering, Density-based clustering, Spectral clustering, Principal Component Analysis, and Neural Topic Modeling ("NTM").

Clustering software techniques can automatically group semantically similar user utterances together to accelerate the derivation and verification of an underneath common user intent—i.e., ascertain or derive a new classification or subject, and not just classification into an existing subject or classification. Unsupervised learning software systems are also used for association rules mining to discover relationships between features from content data. At times, unsupervised learning software systems can be less accurate than well-trained supervised systems.

The system utilizes one or more supervised or unsupervised software processing techniques to perform a subject classification analysis to generate subject data. Suitable software processing techniques for subject classification can include, without limitation, Latent Semantic Analysis, Probabilistic Latent Semantic Analysis, Latent Dirichlet Allocation. Latent Semantic Analysis software processing techniques generally process a corpus of alphanumeric text files, or documents, to ascertain statistical co-occurrences of words that appear together which then give insights into the subjects of those words and documents. The system can utilize software processing techniques that include Non-Matrix Factorization, Correlated Topic Model ("CTM"), and KMeans or other types of clustering.

Content Data Pre-Processing, Vectorization, and Segmentation

The content data is first pre-processes using a reduction analysis to create reduced content data. The reduction analysis first performs a qualification operation that removes unqualified content data that does not meaningfully contribute to the subject classification analysis. The qualification operation removes certain content data according to criteria defined by a provider. For instance, the qualification analysis can determine whether content data files are "empty" and contain no recorded linguistic interaction between an agent and an end user, and designate such empty files as not suitable for use in a subject classification analysis. As another example, the qualification analysis can designate files below a certain size or having a shared experience duration below a given threshold (e.g., less than one minute) as also being unsuitable for use in the subject classification analysis.

The reduction analysis can also perform a contradiction operation to remove contradictions and punctuations from the content data. Contradictions and punctuation include removing or replacing abbreviated words or phrases that can cause inaccuracies in a subject classification analysis. Examples include removing or replacing the abbreviations "min" for minute, "u" for you, and "wanna" for "want to," as well as apparent misspellings, such as "mssed" for the word missed. In some embodiments, the contradictions can be replaced according to a standard library of known abbreviations, such as replacing the acronym "brb" with the phrase "be right back." The contradiction operation can also remove or replace contractions, such as replacing "we're" with "we are."

The reduction analysis can also streamline the content data by performing one or more of the following operations, including: (i) tokenization to transform the content data into a collection of words or key phrases having punctuation and capitalization removed; (ii) stop word removal where short, common words or phrases such as "the" or "is" are removed; (iii) lemmatization where words are transformed into a base form, like changing third person words to first person and changing past tense words to present tense; (iv) stemming to reduce words to a root form, such as changing plural to singular; and (v) hyponymy and hypernym replacement where certain words are replaced with words having a similar meaning so as to reduce the variation of words within the content data.

Following a reduction analysis, the system performs vectorization on the reduced content data to map the alphanumeric text into a vector or matrix form. One approach to vectorising content data includes applying "bag-of-words" modeling. The bag-of-words approach counts the number of times a particular word appears in content data to convert the words into a numerical value. The bag-of-words model can include parameters, such as setting a threshold on the number of times a word must appear to be included in the vectors.

In some embodiments, vectorization includes determining a weighted frequency occurrence of all machine encoded communication elements in a corpus of content data. The frequency, or number of occurrences, for each machine encoded communication element is determined. The frequencies of each machine encoded communication element are divided by the highest frequency to generate the weighted frequency occurrence for each machine encoded communication element. The communication elements are then placed into a matrix format.

Vectorization can be better understood with reference to the following simplified example. A corpus of machine encoded communication elements might include the following where each sentence is a row in a matrix: [I, forgot, my, account, password||The, account, is, locked||Please, reset, my, password, and, account]. Each machine encoded communication element can then be replaced by its frequency, such as: [1, 1, 2, 3, 2||1, 3, 1, 1||1, 1, 2, 2, 1, 3]. Here, the highest frequency is three, so each frequency value is divided by 3 to yield: [0.33, 0.33, 0.66, 1, 0.66||0.33, 1, 0.33, 0.33||0.33, 0.33, 0.66, 0.66, 0.33, 1].

In other examples, the vectorization creates a "sparse matrix" where each sentence, or row of the matrix, includes a frequency value for all distinct machine encoded communication elements within the corpus of content data. Where a communication element does not appear in a sentence, the frequency of the communication element is set to zero. Continuing with the foregoing example, the distinct communication elements include [I, forgot, my, account, password, the, is, locked, please, reset, and]. Each sentence is represented as follows: [1, 1, 1, 1, 1, 0, 0, 0, 0, 0, 0||0, 0, 0, 1, 0, 1, 1, 1, 0, 0, 0||1, 1, 2, 2, 1, 3||0, 1, 1, 1, 0, 0, 0, 1, 1, 1].

Techniques to encode the context of words, or machine encoded communication elements, determine how often machine encoded communication elements appear together. Determining the adjacent pairing of machine encoded communication elements can be achieved by creating a co-occurrence matrix with the value of each member of the matrix counting how often one machine encoded communication element coincides with another, either just before or just after it. That is, the words or machine encoded communication elements form the row and column labels of a matrix, and a numeric value appears in matrix elements that correspond to a row and column label for communication elements that appear adjacent in the content data.

As an alternative to counting communication elements (i.e., words) in a corpus of content data and turning it into a co-occurrence matrix, another software processing technique is to use a communication element in the content data corpus to predict the next communication element. Looking through a corpus, counts are generated for adjacent communication elements, and the counts are converted from frequencies into probabilities (i.e., using n-gram predictions with Kneser-Nay smoothing) using a simple neural network. Suitable neural network architectures for such purpose include a skip-gram architecture. The neural network is trained by feeding through a large corpus of content data, and embedded middle layers in the neural network are adjusted to best predict the next word.

The predictive processing creates weight matrices that densely carry contextual, and hence semantic, information from the selected corpus of content data. Pre-trained, contextualized content data embedding can have high dimensionality. To reduce the dimensionality, a Uniform Manifold Approximation and Projection algorithm ("UMAP") can be applied to reduce dimensionality while maintaining essential information.

Prior to conducting a subject analysis, the system can further perform segmentation of the content data. A segment analysis segments or divides a content data into logical sections or components. The segmentation can be based on structure of the content data, such as lines between text, segment titles and headings, line breaks, indentations, or combinations of such features. In one embodiment, the segments are identified using a categorizer that can be, for example, a probabilistic latent semantic analysis ("PLSA") model trained on a set of segment categories, such as identifying chapters, headings, subheadings, paragraphs, lines of text, or individual words. In one embodiment the categorizer is trained to detect the beginning of each section, for example, by classifying each group of machine encoded communication elements or lines as being a segment identification or not (i.e., words or symbols denoting a segment of the content data).

Two techniques for segmentation include geometric segmentation and logical segmentation. According to geometric segmentation, a electronic document is split into text and non-text based on its geometric structure. Geometric segmentation can be used to identify encoded components that use shapes, symbols, and the like, such as images, symbols, logos, or the like within content data that might be used to denote various headings, subheadings, or sections. A logical segmentation is based on its logical labels such as "call start," "call stop," "opening," "resolution," or other logical components of the content data that represents a shared experience between an end user and an agent. Logical segmentation is a process of splitting digital text into words, sentences, paragraphs, topics or meaningful sections.

Identifying the structure of content data can rely on an analysis of font sizes or machine encoded communication element positioning. In one example embodiment content data parameters such as character size and spacing between characters, or words and lines are used to represent document physical layout.

In one embodiment, the system relies neural networks trained with annotated data that identify divided sections. The system can include separate software modules for line and section classification. The line classification software module itself includes a features extractor and line classifier module. The features extractor takes layout information and text as input. Based on heuristics, the feature extractor software module extracts features from layout information and text. Features include text length, the number of noun phrases, font size, higher line space, bold, italics, colon, and number sequence at the beginning of a line. The line classification module implements multiple classifiers using techniques such as support vector machines, decision tree, Naive Bayes, and Recurrent Neural Networks.

The outputs of the line classifier module can be segment data identifications and standard machine encoded communication element characters. The segment data identifiers may be top-level categorization segment or a sub-segment. The segment classifier module of the segment classification sub unit takes section segment data identifications as input and classifies them as top-level, sub-segments or a top-level segment identification using RNN. The segment classification software module also has a Segment Boundary Detector that detects the boundary of a segment using different level of segment headers and regular text. It generates physically divided segment and finds relationship among top-level, segments and sub-segments. It also generates an index from a electronic document based on the relationship among different levels of segment.

In some embodiments, a semantic annotation software module annotates each divided section with a semantic name. The software module has a semantic labeling module that implements a Latent Dirichlet Allocation ("LDA") topic modeling technique to yield a semantic concept from each of the sections and annotates each section with a semantic concept understandable to system users.

Post processing steps can include: (i) thresholding to create a binary map from the predictions output by the network; (ii) morphological operations that analyze and process geometric structures within the image data (e.g., lines for handwriting, boxes for user inputs, provider logos, etc.); (iii) connected component analysis used to filter out small connected components; and (iv) shape vectorization to transform detected regions into a set of coordinates where "blobs" in the image data are extracted as polygonal shapes, such as lines or quadrilaterals. In addition to segmenting the electronic document into logical sections or components, the system can extract transfer data by grouping machine encoded communication elements into words or groups of words that comprise the transfer data. To illustrate with a simplified example, the system processes an electronic electronic document image using a content recognition analysis to identify the individual machine encoded communication elements, such as a series of characters "P," "a," "t," "r," "i," "c," and "k." The machine encoded communication elements are grouped into words and groups of words are identified as one or more clusters. Thus, the string of machine encoded communication elements above is recognized as a name "Patrick." The name Patrick is identified as a name with semantic and heuristic processing techniques and grouped with additional words to identify a full cluster, such as the individual name "Patrick Smith" or the business name "Patrick Family Restaurants."

Grouping machine encoded communication elements into words can be performed using natural language processing technology alone or in combination with segmentation software processing techniques. In one embodiment, grouping machine encoded communication elements can be performed by an extraction software module that is trained to label words and clusters according to classifications of transfer data, such as a transfer source identification, a transfer target identification, a provider identification, among other categories. The extraction software module can be implemented with a rule-based software technique, with probability models implemented by neural networks, such as Conditional Random Field system, or with combinations of rule-based techniques and neural networks.

Generating words can also be performed by detecting white spaces between machine encoded communication elements. Morpho-syntactic analysis entails identifying candidate parts of speech ("POS") for each word, such as noun (e.g., a transfer source identification) or a verb (e.g., as part of a transfer instruction). This may performed using a rules-based software engine alone or in combination with a hidden Markov model.

The segment analysis and word extraction can generate map index data that identifies the locations of segments and words within content data representing a shared experience. For example, each machine encoded communication element (including spaces between words) can be indexed in a sequence using a time code of when a communication element was generated during a provider-user interaction.

Subject Identification and Content Data Concentration

Prior to conducting a subject analysis to ascertain subjects identifications in the content data (i.e., topics or subjects addressed in the content data) or interaction driver identifications in the content data (i.e., reasons why the end user initiated the interaction with the provider, such as the reason underlying a support request), the system can perform a concentration analysis on the content data. The concentration analysis concentrates, or increases the density of, the content data by identifying and retaining communication elements having significant weight in the subject analysis and discarding or ignoring communication elements having relativity little weight.

The content analysis can alternatively be referred to as "extraction" insofar as the analysis can, in some embodiments, entail extracting words or sentences having a weight (i.e., importance) above or below a specified threshold. The extraction thus identifies and stores content data elements having the most importance so the content data is preserved and used for further processing. Put another way, the concentration analysis can remove words, sentences, paragraphs, or segment having the least importance leaving content data of higher "concentrated" importance. Or alternatively, content data having the highest importance can be extracted and stored in a separate file.

The system can perform the concentration analysis according to various categories. For instance, the content data file can be associated with an agent identification or end user identification data. In that case, content data associated with the agent identification (i.e., content data generated from the agent communications) can be concentrated separately from the content data generated by the end user communications. The result is that the agent or end user sentences or words carrying the most importance or weight are preserved for analysis.

The concentration analysis improves the efficiency and accuracy of a subsequent subject classification analysis, sentiment analysis, polarity analysis, or comparison by filtering out and excluding communication elements (e.g., words, phrases, symbols, or numerical values) that do not appreciably contribute to the subjects, interaction drivers, sentiment identifications, or polarity reflected in the content data. The concentration analysis helps to ensure that certain communication elements of limited or no relevance do not factor into the subject or sentiment analyses, thereby changing the results in a manner that leads to inaccuracies. The concentration analysis also enhanced, or densifies, the results that are obtained.

To illustrate, a user can initiate a support request to report that the user intends to travel and to thus request that the provider authorize transactions outside of the user's normal geographic area. In that case, words relating to geographic locations or travel might appear frequently in the content data and represent, for instance, five percent (5%) of the communication elements in the content data. But after removing communication elements as a result of the concentration analysis, the frequency of words relating to location or travel might increase to eight percent (8%) of all communication elements in the content data. In this manner, the frequency, or relative importance, of certain communication elements is enhanced as lending support to the results of the subject classification, sentiment, polarity, and routing analyses.

In one embodiment, the concentration analysis includes executing a frequency-inverse document frequency ("tf-idf") software processing technique to determine the frequency or corresponding weight quantifier for communication elements with the content data. The weight quantifiers are compared against a pre-determined weight threshold to generate concentrated content data that is made up of communication elements having weight quantifiers above the weight threshold.

The tf-idf is represented by a statistical value that increases proportionally to the number of times a word appears in the content data. This frequency is offset by the number of separate content data instances that contain the word, which adjusts for the fact that some words appear more frequently in general across multiple content data files. The result is a weight in favor of words or terms more likely to be important within the content data, which in turn can be used to weigh some subjects more heavily in importance than others. To illustrate with a simplified example, the tf-idf might indicate that the term "password" carries significant weight within content data. To the extent any of the subjects identified by a natural language processing analysis include the term "password," that subject can be assigned more weight.

In another embodiment, the concentration analysis determines the sum of frequencies or the weighted frequency occurrence values for each row of a matrix representing content data. Referring to the example above relating to a password reset, the frequency value for each matrix row (corresponding to a sentence) is: [3||2||3.33]. The sum of the weighted frequencies is taken as a relative importance of each sentence in a corpus of communication elements. To concentrate the communication elements, the last sentence alone or in combination with the first sentence (i.e., the sentences with the highest weights) can be extracted and stored to a database for further processing. In this manner, the content data is concentrated by eliminating one out of the three original matrix rows (sentences) resulting in a 20% to 30% reduction in the data. In other embodiments, the system utilizes a frequency threshold and only extracts and store sentences that have a total frequency value, or total weighted frequency occurrence value, above the threshold.

In other embodiments, the concentration analysis can utilize neural networking techniques to evaluate the relative importance of each sentence in a content data file. The concentration analysis can then extract and store to a database a set number of sentences with the highest importance scores or those sentences having a score above a predetermined threshold. The content data file is subject to a reduction analysis described above as well as other pre-processing techniques, such as Part of Speech tagging.

Next, each sentence in a content data file is converted to a feature vector. Each feature vector comprises a series of numeric values where each of the numeric values represent a quantization of a sentence feature. For example, a tf-idf analysis can be used to determine the communication elements having the highest frequencies in a content data file, such as "password" and "account," if such words occur in the content data at a high frequency. The number of high-frequency communication elements in each sentence is determined and used as a value in the feature vector. The following sentence, for example, would have a first feature value of two (2): "Please reset my account password." Other features could include, without limitation: (i) sentence positioning, such as a sentence being positioned fourth (4th) out of one-hundred (100) sentences within the text data where "4" would be a feature value in the feature vector; (ii) the number of communication elements in a sentence so that longer sentences have a higher feature value (i.e., a sentence of 5 words would have a feature vector value of "5"; (iii) sentence position within a single paragraph; (iv) the number of nouns in a sentence; or (v) the number of numerals or numbers within a sentence.

Each feature vector can be processed by a neural network in which feature vector values for each sentence are multiplied by trained weights for each node in the network. The output of the neural network could be a probability that the sentence relates to the overall subject of the content data file or another quantitative measure of sentence relevance. Suitable neural networks could include, but are not limited to, a Restricted Boltzmann Machine, a convolutional neural network, or a recurrent neural network, as discussed more fully below.

In other embodiments, the concentration analysis can utilize neural networks to generate new groups of communication elements or sentences that summarize a content data file. For example, sequence-to-sequence modelling utilizes two groups of one or more neural networks-a first group of neural networks that implement an encoder and a second group that implements a decoder. Suitable neural networks include a Long-Short-Term Memory network architecture, a recurrent neural network, or a gated recurrent neural network. The encoder reads the entire input sequence of communication elements where at each timestep, one communication is fed into the encoder. The encoder then processes the input at every timestep and captures the contextual information present in the input sequence. The decoder reads the entire input sequence and predicts the next communication element in the sequence given the previous word. The resulting output is a series of communication elements that summarize the input content data.

The concentrated content data is processed using a subject classification analysis to determine subject identifications (i.e., topics) addressed within the content data. The subject classification analysis can specifically identify one or more interaction driver identifications that are the reason why a user initiated a shared experience or support service request. An interaction driver identification can be determined by, for example, first determining the subject identifications having the highest weight quantifiers (e.g., frequencies or probabilities) and comparing such subject identifications against a database of known interaction driver identifications. To illustrate, the subject identifications from a shared experience having the five (5) highest frequencies or probabilities might include "forgot password," "report fraud," "the weather," "children," and "sports." The provider system compares the top five subject identifications against a list of known interaction driver identifications that includes "forgot password" and "report fraud" as a known support driver but not "weather," "children," and "sports." In that instance, the provider system identifications the two support drivers as being "forgot password" and "report fraud."

In one embodiment, the subject classification analysis is performed on the content data using a Latent Drichlet Allocation analysis to identify subject data that includes one or more subject identifications (e.g., topics addressed in the underlying content data). Performing the LDA analysis on the reduced content data may include transforming the content data into an array of text data representing key words or phrases that represent a subject (e.g., a bag-of-words array) and determining the one or more subjects through analysis of the array. Each cell in the array can represent the probability that given text data relates to a subject. A subject is then represented by a specified number of words or phrases having the highest probabilities (i.e., the words with the five highest probabilities), or the subject is represented by text data having probabilities above a predetermined subject probability threshold.

Clustering software processing techniques include K-means clustering, which is an unsupervised processing technique that does not utilized labeled content data. Clusters are defined by "K" number of centroids where each centroid is a point that represents the center of a cluster. The K-means processing technique run in an iterative fashion where each centroid is initially placed randomly in the vector space of the dataset, and the centroid moves to the center of the points that is closest to the centroid. In each new iteration, the distance between each centroid and the points are recalculated, and the centroid moves again to the center of the closest points. The processing completes when the position or the groups no longer change or when the distance in which the centroids change does not surpass a pre-defined threshold.

The clustering analysis yields a group of words or communication elements associated with each cluster, which can be referred to as subject vectors. Subjects may each include one or more subject vectors where each subject vector includes one or more identified communication elements (i.e., keywords, phrases, symbols, etc.) within the content data as well as a frequency of the one or more communication elements within the content data. The system can be configured to perform an additional concentration analysis following the clustering analysis that selects a pre-defined number of communication elements from each cluster to generate a descriptor set, such as the five or ten words having the highest weights in terms of frequency of appearance (or in terms of the probability that the words or phrases represent the true subject when neural networking architecture is used).

Alternatively, instead of selecting a pre-determined number of communication elements, post-clustering concentration analysis can analyze the subject vectors to identify communication elements that are included in a number of subject vectors having a weight quantifier (e.g., a frequency) below a specified weight threshold level that are then removed from the subject vectors. In this manner, the subject vectors are refined to exclude content data less likely to be related to a given subject. To reduce an effect of spam, the subject vectors may be analyzed, such that if one subject vector is determined to include communication elements that are rarely used in other subject vectors, then the communication elements are marked as having a poor subject correlation and is removed from the subject vector.

In another embodiment, the concentration analysis is performed on unclassified content data by mapping the communication elements within the content data to integer values. The content data is, thus, turned into a bag-of-words that includes integer values and the number of times the integers occur in content data. The bag-of-words is turned into a unit vector, where all the occurrences are normalized to the overall length. The unit vector may be compared to other subject vectors produced from an analysis of content data by taking the dot product of the two unit vectors. All the dot products for all vectors in a given subject are added together to provide a weighting quantifier or score for the given subject identification, which is taken as subject weighting data. A similar analysis can be performed on vectors created through other processing, such as Kmeans clustering or techniques that generate vectors where each word in the vector is replaced with a probability that the word represents a subject identification or request driver data.

To illustrate generating subject weighting data, for any given subject there may be numerous subject vectors. Assume that for most of subject vectors, the dot product will be close to zero—even if the given content data addresses the subject at issue. Since there are some subjects with numerous subject vectors, there may be numerous small dot products that are added together to provide a significant score. Put another way, the particular subject is addressed consistently throughout a document, several documents, sessions of the content data, and the recurrence of the carries significant weight.

In another embodiment, a predetermined threshold may be applied where any dot product that has a value less than the threshold is ignored and only stronger dot products above the threshold are summed for the score. In another embodiment, this threshold may be empirically verified against a training data set to provide a more accurate subject analyses.

In another example, a number of subject identifications may be substantially different, with some subjects having orders of magnitude fewer subject vectors than others. The weight scoring might significantly favor relatively unimportant subjects that occur frequently in the content data. To address this problem, a linear scaling on the dot product scoring based on the number of subject vectors may be applied. The result provides a correction to the score so that important but less common subjects are weighed more heavily.

Once all scores are calculated for all subjects, then subjects may be sorted, and the most probable subjects are returned. The resulting output provides an array of subjects and strengths. In another embodiment, hashes may be used to store the subject vectors to provide a simple lookup of text data (e.g., words and phrases) and strengths. The one or more subject vectors can be represented by hashes of words and strengths, or alternatively an ordered byte stream (e.g., an ordered byte stream of 4-byte integers, etc.) with another array of strengths (e.g., 4-byte floating-point strengths, etc.).

The content data can be visualized and subject to a reduction into two dimensional data using a Uniform Manifold Approximation and Projection algorithm ("UMAP") to generate a cluster graph visualizing a plurality of clusters. The system feeds the two dimensional data into a Density Based Spatial Clustering of Applications with Noise algorithm ("DBSCAN") and identify a center of each cluster of the plurality of clusters. The process may, using the two dimensional data from the UMAP and the center of each cluster from the DBSCAN, apply a K-Nearest neighbor algorithm ("KNN") to identify data points closest to the center of each cluster and shade each of the data points to graphically identify each cluster of the plurality of clusters. The processor may illustrate a graph on the display representative of the data points shaded following application of the KNN.

The system service further analyzes the content data through, for example, semantic segmentation to identify attributes of the content data. Attributes include, for instance, parts of speech, such as the presence of particular interrogative words, such as who, whom, where, which, how, or what. In another example, the content data is analyzed to identify the location in a sentence of interrogative words and the surrounding context. For instance, sentences that start with the words "what" or "where" are more likely to be questions than sentence having these words placed in the middle of the sentence (e.g., "I don't know what to do," as opposed to "What should I do?" or "Where is the word?" as opposed to "Locate where in the sentence the word appears."). In that case, the closer the interrogative word is to the beginning of a sentence, the more weight is given to the probability it is a question word when applying neural networking techniques.

The system can also incorporate Part of Speech ("POS") tagging software code that assigns words a parts of speech depending upon the neighboring words, such as tagging words as a noun, pronoun, verb, adverb, adjective, conjunction, preposition, or other relevant parts of speech. The system can utilize the POS tagged words to help identify questions and subjects according to pre-defined rules, such as recognizing that the word "what" followed by a verb is also more likely to be a question than the word "what" followed by a preposition or pronoun (e.g., "What is this?" versus "What he wants is an answer.").

POS tagging in conjunction with Named Entity Recognition ("NER") software processing techniques can be used by the system to identify various content sources within the content data. NER techniques are utilized to classify a given word into a category, such as a person, product, organization, or location. Using POS and NER techniques to process the content data allow the system to identify particular words and text as a noun and as representing a person participating in the discussion (i.e., a content source).

Sentiment Analysis and Relatedness

The system service can also perform a sentiment analysis to determine sentiment from the content data. Sentiment can indicate a view or attitude toward a situation or an event. Further, identifying sentiment in data can be used to determine a feeling, emotion or an opinion. The sentiment analysis can apply rule-based software applications or neural networking software applications, such as convolutional neural networks (discussed below), a lexical co-occurrence network, and bigram word vectors to perform sentiment analysis to improve accuracy of the sentiment analysis.

Polarity-type sentiment analysis (i.e., a polarity analysis) can apply a rule-based software approach that relies on lexicons, or lists of positive and negative words and phrases that are assigned a polarity score. For instance, words such as "fast," "great," or "easy" are assigned a polarity score of certain value while other words and phrases such as "failed," "lost," or "rude" are assigned a negative polarity score. The polarity scores for each word within the tokenized, reduced hosted content data are aggregated to determine an overall polarity score and a polarity identification. The polarity identification can correlate to a polarity score or polarity score range according to settings predetermined by an enterprise. For instance, a polarity score of +5 to +9 may correlate to a polarity identification of "positive," and a polarity score of +10 or higher correlates to a polarity identification of "very positive."

To illustrate a polarity analysis with a simplified example, the words "great" and "fast" might be assigned a positive score of five (+5) while the word "failed" is assigned a score of negative ten (-10) and the word "lost" is assigned a score of negative five (-5). The sentence "The agent failed to act fast" could then be scored as a negative five (-5) reflecting an overall negative polarity score that correlatives to a "somewhat negative" polarity indicator. Similarly, the sentence "I lost my debit card, but the agent was great and got me a new card fast" might be scored as plus five (+5) reflecting a positive sentiment with a positive polarity score and polarity identification.

The system can also apply machine learning software to determine sentiment, including use of such techniques to determine both polarity and emotional sentiment. Machine learning techniques also start with a reduction analysis. Words are then transformed into numeric values using vectorization that is accomplished through a bag-of-words model, Word2Vec techniques, or other techniques known to those of skill in the art. Word2Vec, for example, can receive a text input (e.g., a text corpus from a large data source) and generate a data structure (e.g., a vector representation) of each input word as a set of words.

Each word in the set of words is associated with a plurality of attributes. The attributes can also be called features, vectors, components, and feature vectors. For example, the data structure may include features associated with each word in the set of words. Features can include, for example, size (e.g., big or little, long or short), action (e.g., a verb or noun), etc. that describe the words. Each of the features may be determined based on techniques for machine learning (e.g., supervised machine learning) trained based on association with sentiment.

Training the neural networks is particularly important for sentiment analysis to ensure parts of speech such as subjectivity, industry specific terms, context, idiomatic language, or negation are appropriately processed. For instance, the phrase "Our rates are lower than competitors" could be a favorable or unfavorable comparison depending on the particular context, which should be refined through neural network training.

Machine learning techniques for sentiment analysis can utilize classification neural networking techniques where a corpus of content data is, for example, classified according to polarity (e.g., positive, neural, or negative) or classified according to emotion (e.g., satisfied, contentious, etc.). Suitable neural networks can include, without limitation, Naive Bayes, Support Vector Machines using Logistic Regression, convolutional neural networks, a lexical co-occurrence network, bigram word vectors, Long Short-Term Memory.

Neural networks are trained using training set content data that comprise sample words, phrases, sentences, paragraphs, or documents for which desired subjects, content sources, interrogatories, or sentiment values are known. A labeling analysis is performed on the training set content data to annotate the data with known subject labels, interrogatory labels, content source labels, or sentiment labels, thereby generating annotated training set content data. For example, a person can utilize a labeling software application to review training set content data to identify and tag or "annotate" various parts of speech, subjects, interrogatories, content sources, and sentiments.

The training set content data is then fed to neural networks to identify subjects, content sources, or sentiments and the corresponding probabilities. For example, the analysis might identify that particular text represents a question with a 35% probability. If the annotations indicate the text is, in fact, a question, an error rate can be taken to be 65% or the difference between the calculated probability and the known certainty. Then parameters to the neural network are adjusted (i.e., constants and formulas that implement the nodes and connections between node), to increase the probability from 35% to ensure the neural network produces more accurate results, thereby reducing the error rate. The process is run iteratively on different sets of training set content data to continue to increase the accuracy of the neural network.

In some embodiments, the system can determine relationships between and among subject identifications and sentiment identifications. Determining relationships among identifications can be accomplished through techniques, such as determining how often two identification terms appear within a certain number of words of each other in a set of content data packets. The higher the frequency of such appearances, the more closely the identifications would be said to be related.

A useful metric for degree of relatedness that relies on the vectors in the data set as opposed to the words is cosine similarity. Cosine similarity is a technique for measuring the degree of separation between any two vectors, by measuring the cosine of the vectors' angle of separation. If the vectors are pointing in exactly the same direction, the angle between them is zero, and the cosine of that angle will be one (1), whereas if they are pointing in opposite directions, the angle between them is "pi" radians, and the cosine of that angle will be negative one (−1). If the angle is greater than pi radians, the cosine is the same as it is for the opposite angle; thus, the cosine of the angle between the vectors varies inversely with the minimum angle between the vectors, and the larger the cosine is, the closer the vectors are to pointing in the same direction.

Virtual Reality and Augmented Reality System

Figure 7:
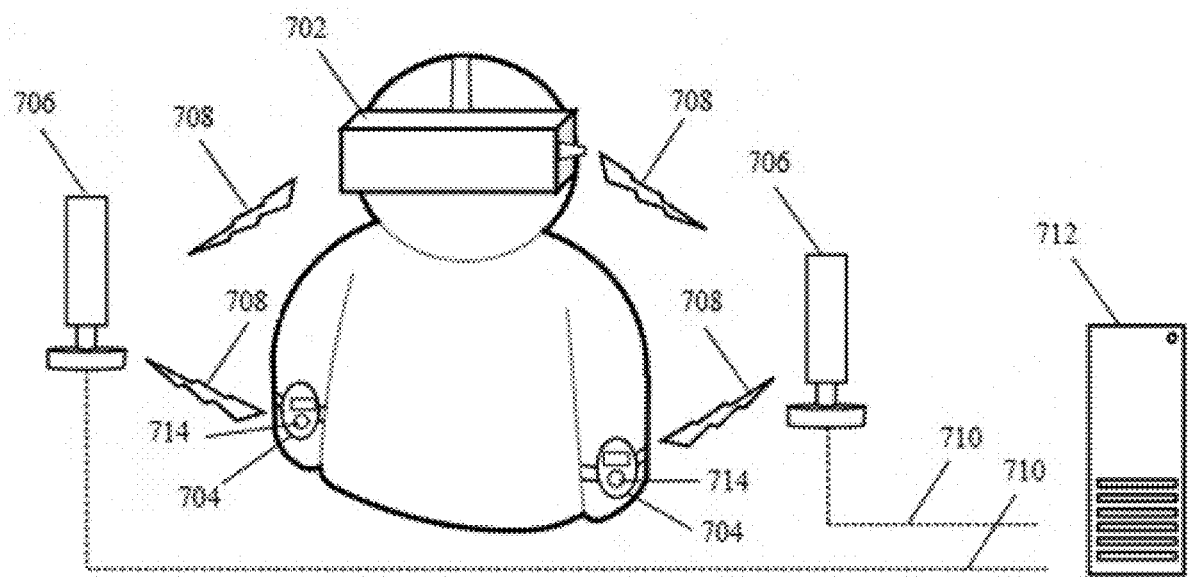
FIG. 7 illustrates equipment items, according to at least one embodiment, used in a virtual reality (VR) session.

The above-described systems and computing devices, in some embodiments, are used in whole or in part to implement virtual reality (VR) and/or augmented reality (AR) functioning. Virtual reality refers to a computer-generated simulation of a three-dimensional image or environment that can be interacted with in a seemingly real or physical way by a person using special electronic equipment, such as a visor or helmet with an internal screen, and gloves, hand-held controller, and/or other effects fitted with sensors. A VR experience is typically immersive, offering the user a typically entirely artificial computer-generated environment. As vision of the real world around the user is occluded by a visor or helmet, a VR session typically occurs indoors and/or in a safe controlled environment for the safety of the user. VR equipment items are typically interactive devices represented in FIG. 7 as a visor or helmet 702, hand-held or mounted controllers 704, and sensors 706. Connections 708 in FIG. 7 represent interconnectivity among the visor or helmet 702, controllers 704, and sensors 706. The connections 708 may be wireless as represented in FIG. 7 and/or may include wired connections as well.

VR applications immerse the user in a computer-generated environment (FIG. 8) that simulates reality through the use of the interactive devices. The helmet or visor provides the user with a stereoscopic view of animated images in the simulated environment. The illusion of "being there" (telepresence) is effected by motion sensors that pick up the user's movements to enable adjustment of the view provided the user in real time. Thus, a user can tour a simulated suite of rooms and environments, experiencing changing viewpoints and perspectives that are convincingly related to their own head turnings and steps. The hand-held or mounted controllers 704 typically include buttons and/or triggers 714 by which user actions are relayed to the participant device 712 to effect user control of their simulated character and/or to implement user actions with the simulated environment. The hand-held or mounted controllers 704 can be equipped with force-feedback devices that provide the sensation of touch. The hand-held or mounted controllers 704 can be ergonomically formed for comfort and secure grasp in use.

The user can, for example, pick up and manipulate objects that they see in the virtual environment. Visual confirmation of hand-held items and their manipulation can be presented to the user in the simulated environment via a simulated view of the hands. Indeed, a whole body or partial body representative of the user may be displayed in graphical form, such as an avatar. In some examples, a graphical indicium representing and/or controlled by the user can be as minimal as a cursor or other indicator. For example, a participant in a VR session may prefer a first person perspective, as through the eyes of their virtual character, such that minimal view of the virtual character's form may be seen by the participant.

Figure 8:
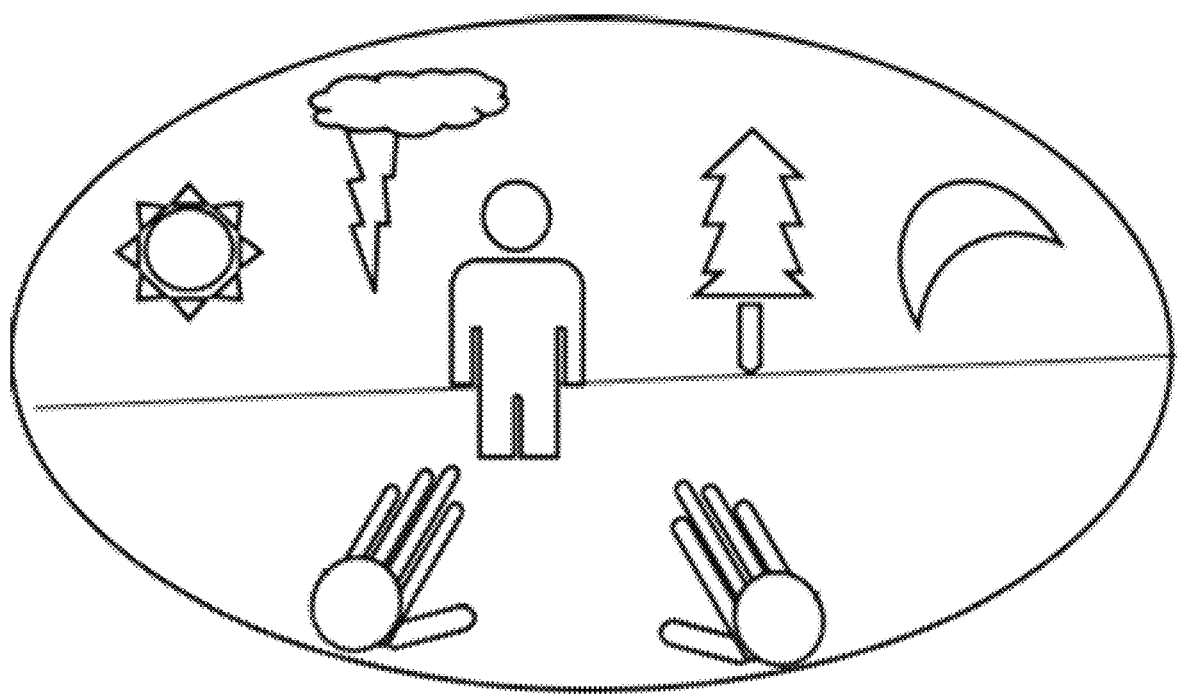
FIG. 8 shows a user view of a simulated environment in a VR session via a helmet or visor.

Connections 710 in FIG. 7 represented interconnectivity between the sensors and/or other interactive devices with the participant device 712 by which calculations and other operation are conducted to dynamically produce the changing simulated environment in which user actions such as hand movements, head movements (looking up, down, left, and right), and user-positioning within a safe environment are typically all represented in the simulated environment. The connections 710 may be wired as represented in FIG. 7 and/or may be or include wireless connections as well. The participant device 712 may represent any of the user computing device 104, a mobile device, and/or the computing system 206 of the enterprise system 200 (FIG. 1). A visual VR session is illustrated in FIG. 8. Audio information may be provided as well, for example via speakers within or mounted on the visor or helmet 702 or other nearby equipment items. A VR session can be used for simulating a training environment and module, gaming, viewing information, navigation, and many other uses.

Augmented reality (AR) refers to the integration of digital information with the user's environment in real time. Unlike virtual reality, which creates a totally artificial environment, AR users experience a real-world environment with computer-generated perceptual information visually combined or overlaid on real world images. The computer-generated simulation of a three-dimensional image or environment can be interacted with in a seemingly real or physical way, typically using a mobile phone such as user mobile device. Because an AR experience does not typically greatly occlude the user's view of their real environment, AR use is potentially more mobile and safer to use outdoors and/or in less controlled environments than VR. However, electronic equipment, such as the visor or helmet 702 (FIG. 7) and hand-held or mounted controllers 704 may be used as well.

Figure 9:
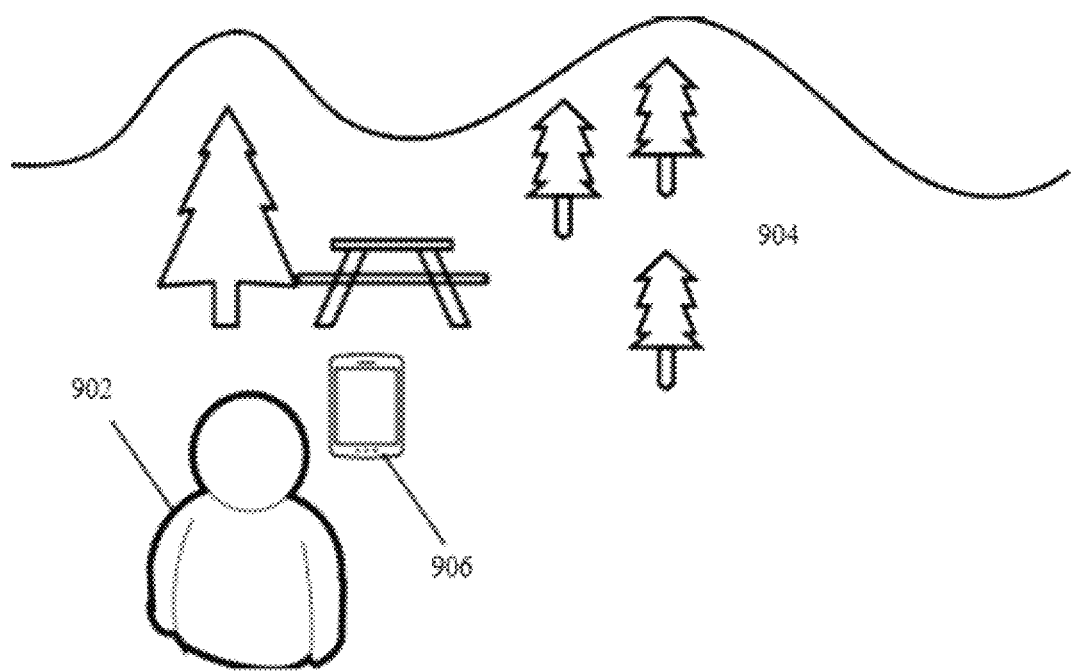
FIG. 9 illustrates an AR session in which a user views a background scene through an AR equipped mobile device.

FIG. 9 illustrates an AR session in which a user 902 views a background scene 904 through an AR equipped mobile device 906. A visual AR session is illustrated. Audio information may be provided as well via speakers of the device 906. The AR image includes characters combined with or overlaid in the background scene 904. Any number of artificial characters and/or objects can be included. An AR session can be used for simulating a training environment and module, gaming, viewing information, navigation, and many other uses.

In the VR training modules described herein, in various embodiments, users 110 interact with a simulated end user in a VR environment. VR training herein provides an ability to mimic real-life challenges to prepare a user 110 for interacting with end-users. Impact of the VR training modules described herein are to enhancing job performance and reducing the real time needed to train compared to traditional methods, for example at least by reducing or eliminating trainee and trainer overhead costs involved in traditional methods.

The VR training module is conducted, in whole or in part, by the computing system 206 (FIG. 1) or in operative communication and/or cooperation with the computing system 206 (FIG. 1) having one or more processor 220 and at least one of a memory device 222 and a non-transitory storage device 224. The processor is configured to execute computer-readable instructions 226 (FIG. 1). A network connection 258 (FIG. 1) operatively connects the computing system to at least one participant device 712 (FIG. 7). Upon execution of the computer-readable instructions 226, the computing system causes a display, by at least one participant device 712, for example via the visor or helmet 702, to a user 110, of a training module in a virtual reality environment, the training module including an operable indicator associated at least with a particular training module. The user 110 controls an user avatar in a virtual reality environment (FIG. 8).

Training Modules

The system ingests the alphanumeric text data associated with content data to generate an interaction driver and at least on interrogatory. The interaction driver is associated with interrogatory data and stored to a relational database integrated with the memory device. The interaction driver consists of reasons the end user initiated the interaction (e.g., the end user forgot their password or the end user was locked out of their account). After ingestion of the alphanumeric text data the system conducts an interrogative analysis to generate interrogatory data, which includes data representing one or more questions or interrogatories posed within the underlying interactive content data and the corresponding response(s). The interrogative analysis also generates source identification data for each interrogatory. Source identification data can include, for example, interaction driver identification data, the name, job title, or affiliate business enterprise (i.e., an employer).

The system optionally performs a sentiment analysis to determine the polarity or emotional descriptor of sentiment for the one or more interrogatories. Alternative embodiments can instead generate a qualitative description of sentiment, such as "optimistic," "frustrated," "contentious," or other applicable sentiment descriptors. The sentiment descriptors are stored as sentiment descriptor data.

The system further performs a subject classification analysis using either the content data as a whole or by processing just the content data comprising the individual interrogatories. In some cases, there may be particular interest by the enterprise in the subjects raised by the various interrogatories within the content data. The subject classification analysis generates subject identification data that includes a list of subjects identified within the analyzed content data.

The subject classification analysis can also generate an interrogative subject identification for each interrogatory identified within the content data. Once the subject identification data is generated, representing a list of subjects, neural networking techniques are used to associate one or more subject identifications with each interrogatory by determining probabilities that particular interrogatories relate to a given subject. The subject-interrogatory pairs with the highest probability are taken as a match.

Interrogatory data can also be associated with one or more interrogatory actions. An interrogatory action analysis can generate interrogatory action data, which includes multiple actions taken by providers in response to an associated interrogatory. The interrogatory action may include an answer (e.g., "I would be happy to assist you, can you please confirm some initial information to get started") or an act (e.g., "I am sending you a link to reset your password").

The feature of matching interrogatories to one or more subject identifications permits end users to better compare subjects that are addressed through various interrogatories generated by various content sources notwithstanding potential syntax or semantic variations between interrogatories. In other words, even if two questions are phrased differently, the system could identify the questions are relating to the same subjects.

The results of the interrogative and subject classification analyses are stored to a relational database in a manner that associates the various types of data. The information stored to the database includes, without limitation: (i) alphanumeric content data that represents one or more interrogatories; (ii) the source identifications; (iii) subject identification data; (iv) the an interrogative subject identifications; and (v) sentiment descriptor data. Storing the information to the relational database ensures that appropriate relationships are maintained, such as associating an interrogatory with the content source identification for the content source that created the interrogatory.

The system can also capture a wide variety of event data generated by an agent using various software applications on the provider system. The provider system can include various proprietary and non-proprietary software applications running on the agent computing devices. Non-proprietary or commercial software applications running on the agent computing devices can include, for instance, the computing device operating system software (e.g., Microsoft Windows®), Java® virtual machine, or Internet browser applications (e.g., Google Chrome® or Internet Explorer®). The software applications capture event data such as text entered in a graphical user interface ("GUI"), the selection of an input function that initiates a keyword search in an Internet browser, or sending a communication through an instant "chat message" software application.

Software applications can be designed and preconfigured to asynchronously capture event data in real time for transmission directly to a provider event manager software service. Non-proprietary applications, however, might not be configured to permit the asynchronous capture and transmission of event data. The agent computing device can, therefore, include a secure desktop monitoring application that establishes a protocol for reading the particular output of the non-proprietary software application and translating the output into a JSON packet for transmission to the event manager software service. Alternatively, where a protocol for reading the output of a non-proprietary software application cannot be established, the secure desktop monitoring application may utilize techniques such as "screen scraping" that captures human-readable outputs from the non-proprietary application intended for display on a monitor.

The event monitor software service performs a transaction analysis that correlates the event data into transactions that represent a series of related activities performed by the agent computing device to accomplish a particular task. For example, conducing an Internet source includes events such as entering alphanumeric text data and then selecting a "search" button input. These entries are correlated with use of a given Internet browser software application and organized into a transaction of "conducting an internet search." These transactions can be incorporated into a training video that shows an agent conducting such an Internet search, as discussed below.

The system generates training video interface data based on the video data, subject identification data, the interaction driver identification, and the event data (organized into transactions). The training video interface data comprises agent computing device user interface display data. The subject identification data, interaction driver identification, at least one interrogatory, and the training video interface data are packaged in a training module. The training module comprises executable training module code.

In one example, the system selects a specific subject generated by the subject identification data. Based on the subject selected, the system will generate the training module consisting of interrogatories associated with the subject. In another example, the system may randomize subject generated by the subject identification data. Based on the subject selected, the system will generate the training module consisting of the interrogatories associated with the subject and the sentiment descriptors associated with the interrogatories. In another example, the system may randomize the sentiment descriptors associated with the interrogatories.

Upon execution of the training module code, a first training interaction is implemented. The first training interaction outputs the training video interface data and the interrogatory to the agent computing device that simulates a virtual interaction between the simulation end user and an agent computing device user. The simulation end user will express interrogatories (e.g., ask questions) associated with a particular sentiment identifier (e.g., frustrated). The agent takes particular actions, such as conducting a transaction whereby the agent accesses the simulation end user's accounts to view potential problems or assist with requests. The video data will render display of the simulated end user's accounts and various potential inputs and account attributes. The simulated end users respond to the agent as the training session continues until the agent marks the simulation as completed.

As the training module is executed, the first training interaction and a set of inputs entered by an agent computing device is received by the provider system. The provider system measures the response to the first training interaction and provides a score. The score can be a binary score (i.e., pass or fail) or a module completion score (i.e., numeric grade score from 0 to 100 or A, B, C, D, F). In another embodiment, the system analyzes the response and outputs one or more example input responses. Example input responses include various acceptable responses to the related interrogatory, which can include a response or an action.

In another embodiment, the system creates a simulation or imitation end user profile for display. The simulation end user profile can be created using source identification data. The simulation profile's source identification data, such that the name, job title, affiliate business enterprise of an end user profile, account balance, products owned, can be assigned to the profile either randomly or systematically to create the end user profile.

Upon the satisfaction of one or more criterion, the training module will be completed and the system will generate a digital certificate and send it to the agent computing device. The digital certificate can also be displayed on the participant device. The system can perform a user training analysis using user training data to produce a user interaction performance measurement. User training data can include time spent in the training module, whether the end user's issue or question was resolved, and the user's dialogue. User interaction performance measurement can be a binary score (i.e., pass or fail) or a module completion score (i.e., numeric grade score from 0 to 100 or A, B, C, D, F). The user training analysis can also provide user feedback regarding which areas the user could improve, such as increasing speed, improving client engagement and communication, and ability to adapt to varying responses and questions posed.

Aspects of the present invention are described herein with reference to flowchart illustrations and/or block diagrams of computer-implemented methods and computing systems according to embodiments of the invention. It will be understood that each block of the flowchart illustrations and/or block diagrams, and combinations of blocks in the flowchart illustrations and/or block diagrams, can be implemented by computer readable program instructions that may be provided to a processor of a general purpose computer, special purpose computer, or other programmable data processing apparatus (the term "apparatus" includes systems and computer program products). The processor may execute the computer readable program instructions thereby creating a means for implementing the actions specified in the flowchart illustrations and/or block diagrams. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the actions specified in the flowchart illustrations and/or block diagrams. In particular, the computer readable program instructions may be used to produce a computer-implemented method by executing the instructions to implement the actions specified in the flowchart illustrations and/or block diagrams.

The computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

In the flowchart illustrations and/or block diagrams disclosed herein, each block in the flowchart/diagrams may represent a module, segment, or portion of instructions, which comprises one or more executable instructions for implementing the specified logical function(s). In some implementations, the functions noted in the blocks may occur out of the order noted in the Figures. For example, two blocks shown in succession may, in fact, be executed substantially concurrently, or the blocks may sometimes be executed in the reverse order, depending upon the functionality involved.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A system for generating a training module comprising a computer that includes at least one processor, a communication interface, and a memory device that stores executable code that, when executed, causes the at least one processor to:
    (a) activate a digital recorder that captures event data and interactive communications and stores the interactive communications to the memory device as interactive content files, wherein the interactive content files comprise audio data and video data that was output to a display device coupled to an agent computing device;
    (b) convert the audio data to alphanumeric text data;
    (c) generate an interaction driver and at least one interrogatory based on the alphanumeric text data, wherein the interaction driver is associated with the interrogatory and stored to a relational database integrated with the memory device;
    (d) generate training video interface data based on the video data, the event data, and the interaction driver, wherein the training video interface data comprises agent computing device user interface display data;
    (e) package the interaction driver, the least one interrogatory, and the training video interface data into a training module that comprises executable training module code;
    (f) execute the training module code to implement a first training interaction, wherein the first training interaction outputs the training video interface data and the interrogatory to the agent computing device that simulates a virtual interaction between an end user and an agent computing device user;
    (g) receive a first set of inputs to the first training interaction;
    (h) measure an interaction performance measurement of the user associated with the first training interaction; and
    (i) present the user interaction performance measurement of the agent computing device associated with the first training interaction to a supervisor computing device.

2. The system for generating a training module of claim 1, wherein the selection module comprises a neural network that generates the training video interface data.

3. The system for generating a training module of claim 2, wherein the neural network implements a clustering network architecture.

4. The system for generating a training module of claim 1, wherein the executable code causes the at least one processor to, prior to step (h), output one or more example input responses integrated with the first training interaction.

5. The system for generating a training module according to claim 1, wherein a completion of the training module is defined by at least one criterion satisfaction, and wherein, upon completion of the training module, a digital certificate is generated and sent to the agent computing device.

6. The system for generating a training module according to claim 1 further comprising a virtual reality display device coupled to the agent computing device, wherein the virtual reality display device renders the video interface data in a three dimensional virtual reality environment.

7. The system for generating a training module according to claim 6, wherein the three dimensional virtual reality environment is generated using a three-dimensional model based at least in part on photogrammetry.

8. The system for generating a training module according to claim 6, wherein executing the executable code further causes the processor to:
(a) determine a sentiment identification using the alphanumeric text data; and
(b) incorporate the sentiment identifier into the training module, wherein the interrogatory is output to the user computing device based on the sentiment identification.

9. A system for generating a training module comprising a computer that includes at least one processor, a communication interface, and a memory device that stores executable code that, when executed, causes the at least one processor to:
(a) activate a digital recorder that captures event data and interactive communications and stores the interactive communications to the memory device as interactive content files, wherein the interactive content files comprise audio data and video data that was output to a display device coupled to an agent computing device;
(b) convert the audio data to content data that comprises machine encoded communication elements;
(c) generate an interaction driver and interrogatory data based on the machine encoded communication elements;
(d) generate training video interface data based on the video data, the event data, and the interaction driver, wherein the training video interface data comprises agent computing device user interface display data;
(e) generate a simulated user based on the machine encoded communication elements, wherein the simulated user is configured to output the interrogatory data;
(f) package the interaction driver, the interrogatory data, the training video interface data, and simulated end user into a training module that comprises executable training module code;
(g) execute the training module code to implement a first training interaction, wherein the first training interaction outputs the training video interface data and the interrogatory data to the agent computing device that simulates a virtual interaction between the simulated end user and an agent computing device user; and
(h) receive a set of inputs to the first training interaction, wherein the set of inputs comprise (i) audio data generated by an agent and recorded by the agent computing device, and (ii) selections input to a graphical user interface displayed on the agent computing device.

10. The system for generating a training module according to claim 9, wherein a completion of the training module is defined by at least one criterion satisfaction.

11. The system for generating a training module according to claim 9 further comprising a virtual reality display device coupled to the agent computing device, wherein the virtual reality display device renders the video interface data in a three dimensional virtual reality environment.

12. The system for generating a training module according to claim 9, wherein executing the executable code further causes the processor to:
(a) determine a sentiment identification using the machine encoded communication elements; and
(b) incorporate the sentiment identifier into the training module, wherein the interrogatory is output to the user computing device based on the sentiment identification.

13. The system for generating a training module according to claim 9, wherein executing the executable code further causes the processor to measure an interaction performance score of the user associated with the first training interaction, and wherein the interaction performance score is measured based on the set of inputs.

14. The system for generating a training module according to claim 13, wherein a completion of the training module is defined by at least one criterion satisfaction, and wherein, upon completion of the training module, a digital certificate is generated and sent to the agent computing device.

15. A method for a computing system to create a training module for users using artificial intelligence in a graphically simulated training environment, comprising:
at least one processor,
a communication interface communicatively coupled to the at least one processor; and
a memory device storing executable code, when executed operates to:
(a) receive labeled a selection of training videos and alphanumeric content data,
(b) input the selection of training videos and alphanumeric content data into training module assembly software service, wherein the first training module assembly software service is configured to learn patterns in the selection of training videos and alphanumeric content data and generate one or more training modules with the learned patterns;
(c) generate a first training interaction between the user and a simulated end user;
(d) receive a first set of user responses to the first training interaction;
(e) measure a user interaction performance measurement of the user associated with the first training interaction;
(f) present the user interaction performance measurement of the user associated with the first training interaction to a supervisor;
a computing system including one or more processor, at least one of a memory device and a non-transitory storage device, and a network connection for operatively connecting the one or more processor to at least one user device, the one or more processor configured to execute computer-readable instructions, the method comprising, upon execution of the computer-readable instructions:
(a) causing display, by at least one participant device, of a first graphical indicium in a three dimensional virtual reality environment, the first graphical indicium controlled by a first real-time human participant;
(b) causing display, by at least one other participant device, of a second graphical indicium in the three dimensional virtual reality environment, the second graphical indicium controlled by a second real-time human participant; and
(c) conducting a training module via virtual interaction of the first graphical indicium and the second graphical indicium in the three dimensional virtual reality environment,
(d) wherein the first graphical indicium is displayed in the three dimensional virtual reality environment to said second real-time human participant by said at least one participant device, and
(e) the second graphical indicium is displayed in the three dimensional virtual reality environment to said first real-time human participant by said at least one other participant device to said first real-time human participant by said at least one other participant device.

16. The method of claim 15, wherein the training module assembly software service comprises a neural network that implements a clustering algorithm.

17. The method of claim 15, wherein the executable code causes the at least one processor to provide the user with a suggested response data prior to receiving a first set of user responses to the first training interaction.

18. The method according to claim 15, wherein a completion of the training module is defined by at least one criterion satisfaction, and wherein, upon completion of the training module, a digital certificate is generated and sent to at least one of said participant device and said other participant device.

19. The method according to claim 15, wherein
   (a) the first real-time human participant is a trainee; and
   (b) the second real-time human participant is at least one of a trainer, a supervisor, or a manager.

20. The method according to claim 15, wherein the computing system further causes display in the three dimensional virtual reality environment, on said participant device and said other participant device, a graphical indicium representing a virtual agent.

* * * * *